March 27, 1951
C. H. WHITE ET AL
2,546,412
PLANTER MARKER
Filed Jan. 11, 1946
2 Sheets—Sheet 2
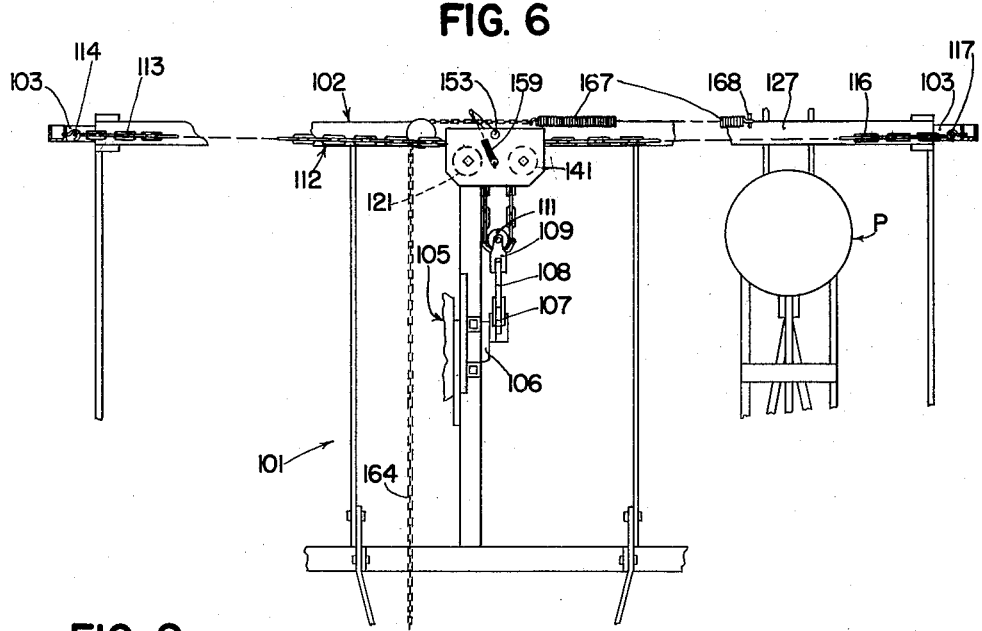
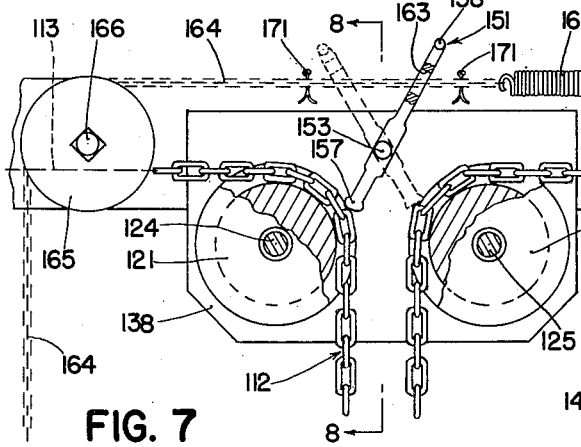
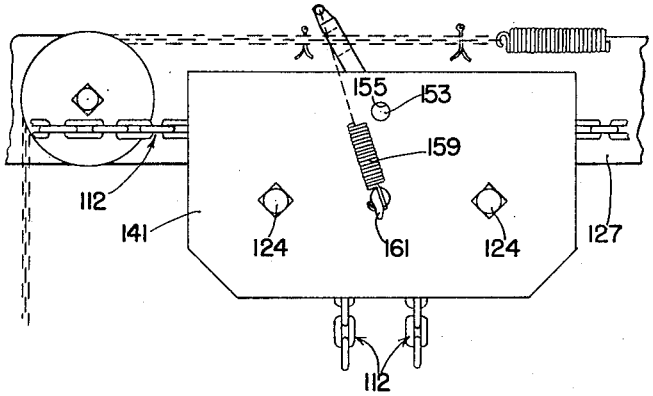
INVENTOR.
CHARLES H. WHITE
WILLIAM P. OEHLER
BY
ATTORNEYS.

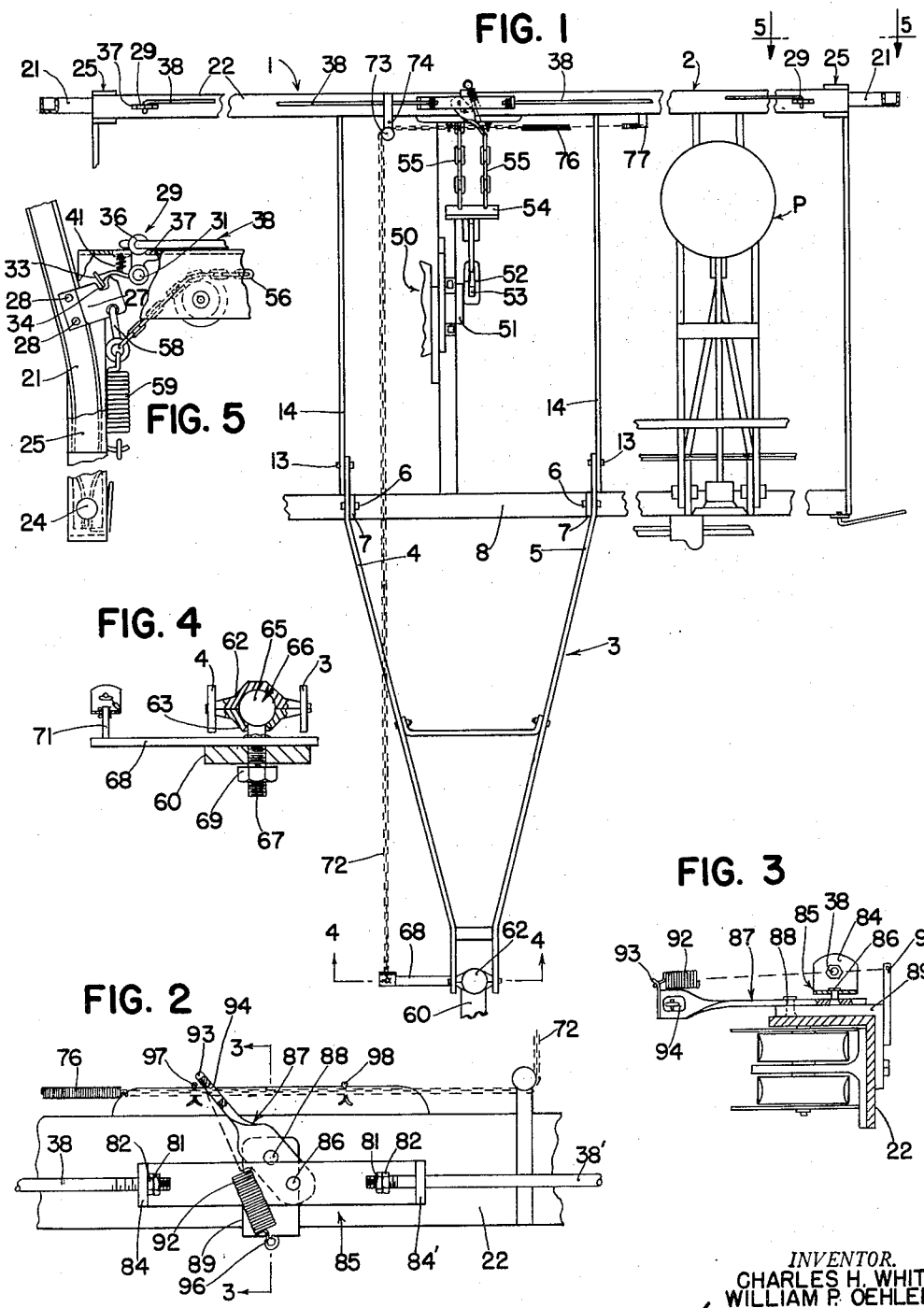

Patented Mar. 27, 1951

2,546,412

UNITED STATES PATENT OFFICE 2,546,412

PLANTER MARKER

Charles H. White and William P. Oehler, Moline, Ill., assignors to Deere & Company, Moline, Ill., a corporation of Illinois Application January 11, 1946, Serial No. 640,530

27 Claims. (Cl. 97—230)

The present invention relates generally to agricultural implements and more particularly to planters and other machines employing a ground engaging marker or markers.

The object and general nature of the present invention is the provision of a tractor propelled planter wherein the markers are controlled by the turning of the tractor relative to the planter. Heretofore, tractor planters having markers have been constructed so that the markers are controlled by a raising and lowering of the planter shoes or furrow openers. For example, in the United States Patent No. 2,376,464, issued May 22, 1945, to Charles H. White, there is shown a marker control mechanism of the type in which latch means holds both markers in an elevated position, with the latches alternately being released by successive operations of the raising and lowering means. However, it is sometimes desirable to be able to raise and lower the planter shoes without having the markers reversed. With this in mind, the principal feature of the present invention is the provision of a marker control that is actuated by the turning of the tractor, in either direction, through a given extent for operating the marker controls. More specifically, it is a principal feature of this invention to provide a marker control mechanism which is responsive to the turning of the tractor relative to the implement for controlling the markers, and in which the connection with the tractor involves only a single element, preferably in the form of a chain which may be connected with a part of the tractor simply and easily.

These and other objects of the present invention will be apparent to those skilled in the art after a consideration of the following detailed description, taken in conjunction with the accompanying drawings in which one preferred form of the invention has been illustrated.

In the drawings:

Figure 1 is a fragmentary plan view of the tractor planter of the towed type, in which the principles of the present invention have been incorporated.

Figure 2 is a fragmentary enlarged view of the parts of a marker control which are carried on a central rear portion of the planter.

Figure 3 is a sectional view taken generally along the line 3—3 of Figure 2.

Figure 4 is a sectional view taken along the line 4—4 of Figure 1, showing portions of the marker control mechanism that are carried on the tractor.

Figure 5 is a fragmentary detail view, taken generally along the line 5—5 of Figure 1, showing the manner in which the marker arms are supported and controlled.

Figure 6 is a plan view, somewhat similar to Figure 1, showing a modified form of the present invention in which the marker latches are eliminated.

Figure 7 is an enlarged plan view of a portion of the marker control mechanism.

Figure 8 is a view taken generally along the line 8—8 of Figure 9.

Figure 9 is a view, somewhat similar to Figure 7, but showing certain parts in section, the better to illustrate the action thereof.

Referring first to Figure 1, the planter which is indicated in its entirety by the reference numeral 1 is substantially the same as shown in the above mentioned White patent, embodying a generally rectangular frame 2 supported by ground wheels (not shown) and a hitch or draft link 3 that comprises generally longitudinally extending bars 4 and 5 pivoted at 6 to brackets 7 carried on the front angle 8 of the main frame 1. Bolts 13 pass through selected openings in the rear ends of the bars 4 and 5 and through openings in the adjacent cross bars 14 of the frame for connecting the hitch frame 3 to the planter frame 1 in the desired position.

A marker arm 21 is disposed at each end of the frame 1, preferably in the vertical lateral plane of the rear main frame angle 22. The pivotal support of the marker arms 21 is best shown in Figure 5, both marker arms being mounted in substantially the same way, and hence a description of one of the mountings will suffice. Referring now to Figure 5, the inner end of the marker arm 21 is apertured to receive a pivot pin 24, the latter being carried at the lower end of a standard 25. The upper end of the latter is fixed in any suitable manner to the outer end of the rear frame angle 22. A latch bracket 27 is secured, as by rivets 28 or the like, to the marker arm 21 at a point thereof adjacent the end of the frame angle 22 when the marker arm is raised, which is the position shown in Figure 5. A marker arm latch 29 is pivotally mounted on a bolt 31 carried by the main frame angle 22 and is provided with a detent 33 that is adapted to engage in a notch 34 formed in the marker bracket 27. The marker latch 29 also includes an end 36 that extends upwardly through a slot 37 formed in the horizontal flange of the main frame angle 22, the end 36 being apertured to receive the laterally bent end of the associated latch controlling rod 38. In Figure 2, the right-hand rod is indicated by the numeral 38'. A spring 41 bears at one end against the horizontal flange of the angle 22 and at the other end against the detent 33, tending to cause the latter to engage the notch in the bracket 27. The spring 41 thus serves as means biasing the latch 29 for engagement in the marker bracket notch 34.

The planter is equipped with a power lift unit indicated fragmentarily by the reference numeral 50. The power lift unit preferably is traction driven and may be of any suitable construction, preferably like that shown in the White patent identified above. Briefly, power lift unit 50 includes a crank arm 51 carrying a block 52 in which a swinging link or arm 53 is disposed, this linkage being preferably in the form of a Whitworth quick return linkage. The arm 53 carries a plate 54 to which a plurality of chains 55 are connected. The chains 55 are carried laterally outwardly along the main frame angle 22 and are connected with the rear ends of the several furrow openers (not shown). Thus, the operation of the power unit 50 serves to raise and lower the furrow openers. A marker arm lifting chain 56 (Figure 5) is connected between the adjacent lifting chain 55 and at its outer end is connected to a link 58 which, with a spring 59, forms a cushioned connection between the marker arm lifting chain 56 and associated marker arm. When the lifting arm 53 is swung forwardly to raise the furrow openers both marker arms 21 are also raised, the latches 33 moving into the associated notches 34 for locking the marker arms in their raised position.

According to the principles of the present invention, the marker rods 38 extending longitudinally inwardly from the outer ends of the frame are controlled by mechanism that responds to the turning of the tractor relative to the implement. In Figure 1, the tractor is represented by the tractor drawbar 60, and as best shown in Figure 4, the forward ends of the hitch frame bars 4 and 5 are formed in forwardly converging relation and apertured to receive the upper and lower halves 62 and 63 of a socket member which is trunnioned in the forward ends of the hitch frame 3. Received by the socket members 62, 63 is the ball end 65 of a hitch connection 66, the lower end of which is in the form of a threaded shank 67 that extends downwardly through an opening in the tractor drawbar 60. A turning bar 68 is fixed, as by welding, to the shank 67, and a nut 69 is threaded onto the lower end of the shank 67 so that, when tightened, both the ball 65 and the turning bar 68 are rigidly and securely connected to the tractor drawbar so as to turn therewith when the tractor turns relative to the implement.

A stud 71 is fixed to the outer end of the turning bar 68 and receives the forward end of a chain 72 that extends rearwardly alongside the hitch frame 3 and passes over a sheave 73 carried by a bracket 74 on the rear frame angle 22. The chain 72 is then extended laterally outwardly toward the left of the machine where its end is connected to a spring 76 that, in turn, is anchored to a bracket 77 fixed to the left portion of the rear frame angle 22. The function of the spring 76 will be explained below in detail.

The two marker control rods 38 and 38' extend laterally inwardly along the rear frame angle 22 and have their laterally inner ends threaded to receive a pair of lock nuts 81 and 82 which serve as abutments at the inner ends of the rods 38 and react against the upturned ends 84 and 84', through the openings in which the inner ends of the rods 38 pass, of a yoke member 85 that is pivotally supported, as at 86, on the rear end of a laterally swingable toggle lever 87 which is mounted on a pivot 88 on a bracket 89 carried by the frame angle 22, as best shown in Figure 2. The yoke 85 constitutes a central section of the connecting means extending transversely from one marker latch to the other and is disposed transversely of the planter, being shiftable transversely in one direction or the other by the lever 87 to shift the rods 38 to control the marker latches. A spring 92 is connected at its forward end to a hook 93 which is carried at the front end of the toggle lever 87, the latter being apertured, as at 94, to provide for the passage of the turning control chain 72 therethrough. The other end of the spring 92 is anchored to a vertically extending rod 96 which is welded or otherwise secured to or formed on the rear portion of the bracket 89, as best shown in Figure 3. The anchor 96 is disposed in the generally vertical longitudinal plane of the pivot 88 but rearwardly of the pivot, so that the action of the spring 92 is to tend to hold the toggle lever 87 either in one position or the other, the terminal positions of the toggle lever 87 being determined by the fact that the laterally inward movement of each of the latch rods 38 and 38' is limited by the spring 41 (Figure 5) and associated parts serving to limit the upward swinging of the detent 33. A pair of abutment members 97, which may be in the form of cotters engaged to certain of the links of the chain 72, are disposed on opposite sides of the toggle arm 87. In operation, whenever, for example, the tractor turns to the left, the arm 68 exerts a forward pull on the chain 72 which tends to pull the cotter 97 toward the right side of the machine (toward the left side of Figure 1 and the right side of Figure 2). As soon as the movement of the chain 72 is sufficient to bring the toggle lever 87 slightly past its dead center position, the spring 92 completes the movement of the toggle lever 87, swinging the same toward the left as viewed in Figure 2 which thus releases the left-hand latch rod 38 for movement toward the left hand latch, permitting it to release its latch 33 for engagement with the bracket 27 on the associated marker arm 21, thus holding the latter in position. The above mentioned movement of the lever 87 in shifting the yoke 85 to the left, as viewed in Figure 2, results in the right end 84' of the yoke 85 shifting the other latch rod 38' laterally inwardly, thus pulling the right hand latch 33 up out of the notch 34 in the bracket 27, which releases the right hand marker arm and permits the same to lower at any time that the power lift unit 50 is operated to swing the arm 53 rearwardly to lower the furrow openers, thus automatically lowering the marker arm when the tools or furrow openers are lowered.

If the tractor should be turned in the other direction, namely, to the right, the rearward swinging of the turning bar 68 permits the spring 76 to pull the rear end of the chain 72 in the other direction, thus bringing the cotter 98 against the toggle lever 87 (in a position opposite to that shown in Figure 2) until the amount of turning has been sufficient to cause the cotter 98 to shift the toggle lever 87 slightly beyond this over-center position, after which it snaps over into the full line position shown in Figure 2, thus reversing the marker control. The lever 87 and spring 92 thus constitute snap action mechanism for quickly shifting the latches 29.

It will be noted that there is some lost motion not only between the cotters 97 and 98 and the rear end of the toggle lever 87, but also between the rods 38 and the ends 84 of the shifting yoke 85. The amount of lost motion present in the system may be increased or decreased, as required, so that normal weaving or variation in operation does not have any effect on the marker arm latches. However, when the tractor is turned definitely and positively through a predetermined amount, such as, for example, 30 degrees, the toggle lever 87 is swung from one side to the other, which changes the positions of the rods 38 and the associated marker arm detents so that when the tools are lowered the opposite marker arm will be lowered into ground contacting position. In normal operation the tractor is turned in one direction at one end of the field and in the opposite direction at the other end of the field, whereby first one marker latch is operated to permit one marker arm to lower and the other latch is operated subsequently at the other end of the field to permit the other marker arm to lower, this occurring alternately. Yet the furrow openers may be raised and lowered during normal forward travel without in any way affecting the markers, this being necessary when it is desired to cross grass strips, terraces and the like.

The structure shown and described above is particularly adaptable to a planter of the four row type, such as is disclosed in the above-mentioned White patent, where the marker arms are fairly long and rather heavy and in which it is desirable to control them by direct connection to the power lift arm, with the turn control described above operating only on the latches which are alternately used to hold one or the other of the marker arms in elevated position. In two row planters, where the marker arms are fairly short, the turn control may act directly on the chains that extend laterally outwardly to the marker arms and the detent latches and associated parts, shown in Figures 1 et seq., may be eliminated.

Turning now to the invention shown in Figures 6 et seq., the reference numeral 101 indicates a two row planter which includes a frame 102 and a pair of relatively short marker arms 103 which are pivoted to the ends of the frame 102 in substantially the same manner as described above in connection with the planter 1. The planter 101 is provided with a power lift unit 105 which is substantially the same as the power lift unit 50. The unit 105 includes a crank member 106 forming a part of a Whitworth quick return linkage which also includes an arm 107 connected by a link 108 to a yoke 109 which carries a sheave 111. A chain 112 is trained about the sheave 111 and has one end portion 113 connected by a hook or other connector 114 to the right hand marker arm 103, and the other end 116 of the chain 112 is connected by a hook or other connector 117 to the left hand marker arm 103. The length of the chain 112 is such that when the power lift unit 105 is operated to raise the planter units P both of the marker arms 103 are raised and are held by the chain 112 in their raised position.

When it is desired to place the planter in operation, the power lift unit 105 is operated to lower the planter units 3 and at this time it is desired also to lower one or the other of the marker arms 103 but to hold the opposite marker arm in an elevated position. Referring first to Figure 9, it will be noted that the right and left portions 113 and 116 of the chain 112 are extended laterally inwardly and pass over sheaves 121 and 122 that are supported on bearing bushings or the like carried by a pair of attaching bolts 124 and 125. As best shown in Figure 8, the frame 102 includes a rear angle member 127, and secured to the rear vertical flange 128 of the angle member 127 in a bracket in the form of a T casting 129 which serves as a support for the sheave bearings and associated parts. Specifically, the horizontal portion 131 of the T casting 129 is provided with a central opening 132 which receives the lower end of the bolt 124. A bearing bushing 135 is clamped between the section 131 of the bracket 129 and an upper plate 136, which is also apertured to receive the bolt 124. A short spacer 137 is disposed above the plate 136 and below a similar plate 138, also operative to receive the bolt 124. A bushing 139, similar to the bushing 135, receives the upper sheave 121 and bears at its lower end against the plate 131 and at its upper end against an upper plate 141. When the nut 142 on the bolt 124 is tightened, these parts are firmly fixed to the bracket 129. The latter is secured to the frame angle 127 by one or more cap screws 144. A lower sheave 145 is disposed for rotation on the bushing 135 and receives a lower chain 146 which is connected at its ends with the planting units P and at its intermediate portion passes around a sheave below the sheave 111 (Figure 6) carried by the yoke 109. The sheave 122 and a lower sheave similar to the sheave 145 are supported on the plates 136, 138 and 141, and the T casting 129, in the same manner as described for the sheaves 121 and 145.

As best shown in Figures 8 and 9, a latch member in the form of a detent 151 is provided with a pair of trunnions 152 and 153 which are received in openings 154 and 155 formed, respectively, in the plates 138 and 141, whereby the latch or detent 151 is swingable between the two positions shown in Figure 9 in full and dotted lines, respectively. The detent or latch member 151 is formed with a chain-engaging nose portion 157 and a tail or hook portion 158. A spring 159 engages the portion 158 and at its forward end is anchored to a clip 161 carried by the upper plate 141, as best shown in Figure 7. The detent 151 and spring 159 thus constitute snap action mechanism for quickly reversing the marker control. The detent 151 also has an opening 163 through which a turn control chain 164 extends. The chain 164 is trained over a sheave 165 carried by a bolt 166 on the frame angle 127, and the chain 164 extends forwardly and is connected to a turn bar, substantially identical for all practical purposes to the turn control bar 68 shown in Figure 1. The rear end of the turn control chain 164 is connected to the right end of a spring 167, the left end of which is connected, as at 168, to the rear frame angle 127. The rear end of the chain 164 extends through the opening 163 in the latch detent 151. The chain carries a pair of abutments, preferably in the form of two cotters 171 so spaced that after the tractor turns through a predetermined amount, one or the other of the cotters 171 will swing the latch detent from one position to the other, causing the nose 157 to lock one or the other of the portions of the chain 112, against the associated sheave and thus hold the associated marker in a raised position, permitting the other marker to lower. This arrangement wherein the marker raising and lowering chain is locked directly to the planter frame is somewhat simpler and more inexpensive than the arrangement shown in Figure 1 wherein the turn control chain controls the marker latches.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. In a planter adapted to be connected to a tractor in towed relation, said planter having a pair of marker arms, the combination of means for raising both of said marker arms into an inoperative position, said means including a connection extending to each arm, latch means cooperating with said connections and movable into alternate positions for locking one or the other of said arms against movement, and means responsive to the turning of the tractor relative to the planter beyond a given position for operating said latch means to shift the latter from one position to another.

2. In combination, a towed planter adapted to be connected to a tractor and to turn laterally relative to the latter, a pair of generally vertically swingable marker arms, alternately operable means for locking one or the other of said arms in elevated position, and means for controlling said alternately operable locking means comprising a turn bar adapted to be fixed to the tractor and to extend laterally in one direction, a connection extending rearwardly from said arm with its rear end disposed adjacent said locking means, means on said connection adapted when the tractor turns with respect to the planter in one direction for shifting said locking means from one position to another, and a spring connected at one end with said connection and at its other end with the planter and adapted to shift said locking means from said other position back to said one position when the tractor turns in the other direction with respect to said planter.

3. In a towed planter adapted to be pulled by a tractor or the like and including marker raising means, individually operable latches for controlling the lowering of said markers, a turn bar adapted to be connected with the tractor, a chain extending rearwardly from the outer end of said bar, a spring biased toggle member adapted to shift said latches when the chain is shifted in one direction by the turning of the tractor relative to the planter in one direction, a spring connected with the rear end of said chain and adapted, when the tractor is turned in the other direction, to reverse said latches.

4. In a towed planter adapted to be pulled by a tractor or the like and including vertically swingable markers and marker raising means, individually operable latches for locking said marker arms in raised position, means interconnecting said latches whereby one is held in released position while the other occupies a marker arm engaging position, snap action means connected with said latch-interconnecting means for reversing the positions of said latches, and means responsive to the turning of the tractor relative to the planter for operating said snap action means.

5. In a tractor planter, a pair of vertically swingable marker arms, a pair of latches engageable with said arms, respectively, for locking them alternately in raised position, connecting means extending between said latches and comprising a section disposed transversely of the planter and connected at one end with one of the latches and at the other end with the other of the latches, said section being shiftable transversely of the planter in one direction for releasing one latch from its associated arm and causing the other latch to be engaged with its associated arm, a pivotally mounted lever including a laterally shiftable portion connected with said transversely extending and transversely shiftable section for shifting the latter from one position to another for reversing said latches, and means for shifting said pivotally mounted lever.

6. In a tractor towed planter, a pair of vertically swingable marker arms, a pair of latches engageable with said arms, respectively, for locking them alternately in raised position, connecting means extending between said latches and shiftable in one direction for releasing one latch from its associated arm and causing the other latch to be engaged with its associated arm, a pivotally mounted lever operatively associated with said latch-interconnecting means and adapted to be shifted from one position to another for reversing said latches, means carried by the planter and shiftable in opposite directions for changing the position of said pivotally mounted lever for reversing said latches, and means responsive to the turning of the tractor relative to the planter for operating said shifting means.

7. In a tractor towed planter, a pair of generally vertically swingable marker arms, means on the planter for locking said arms alternately in raised position including a pivotally mounted part swingable from one position to the other for locking one or the other of said markers in raised position, and means responsive to the turning of the tractor relative to the planter for changing the position of said pivotally mounted means.

8. A tractor planter adapted to be connected to a tractor in trailing relation, comprising frame means, a pair of marker arms swingably connected therewith, means for raising both of said marker arms including a chain connected to each of said arms, a pair of generally centrally located sheaves over which said chain is trained, and a latch means pivotally mounted in a position generally between said sheaves and engageable alternately with one or the other of the chains at the point where it passes over the associated sheave for locking the associated marker arm in a raised position.

9. In a tractor towed planter, frame means, a pair of marker arms swingably connected therewith, a chain connected at its outer ends with said arms, respectively, means for exerting a pull on said chain comprising a forwardly swingable part mounted on said frame means, a pair of sheaves mounted on said frame means in generally contiguous relation and receiving the portions of said chain that extend outwardly to the marker arms, chain engaging mechanism comprising a detent pivotally mounted on said planter frame means and having a portion swingable from one position in which it engages one of said chain portions to another position in which it engages another chain portion, and spring means acting to yieldably hold said detent in either one or the other of its positions.

10. In a tractor planter, a pair of marker latches, a latch operating member connected with each of said latches, a yoke connected to the adjacent ends of each of said latch operating members, said yoke having a lost motion connection with each of said members, and a snap action mechanism operatively connected with said yoke for shifting the latter from one position to another.

11. In a tractor planter, a pair of marker arm latches, laterally inwardly extending rods connected, respectively, at their outer ends with said latches, a connecting member having lost motion connection with the inner ends, respectively, of said rods, a toggle lever pivotally mounted on the planter and connected to shift said connecting member from one position to another, and a biasing spring acting against said toggle lever for yieldably holding the same in one or the other of its positions.

12. The invention set forth in claim 11, further characterized by shiftable means having a lost motion connection with said toggle lever for shifting the same from one position toward the other.

13. In a planter marker control mechanism, frame means, a toggle lever pivotally connected thereto, a pair of marker arm locking means adapted to be engaged, alternately, by said toggle lever, there being an opening in said toggle lever, spring means acting against said toggle lever for yieldably holding the same in either of its positions and an operating chain extending through said opening and carrying abutment means on opposite sides of said toggle lever and adapted to shift the latter from one position to another by movement of said chain in one direction or the other.

14. In a tractor planter having controllable marker means, a transversely disposed turn control member comprising a part having an inner end and an outer end adapted to extend laterally outwardly, a ball member fixed to the inner end of said member and adapted to receive the forward end of the planter, means for fixing said ball and said turn control member to the drawbar of a tractor, a marker controlling connection connected with the laterally outwardly disposed end of said first mentioned member, and a planter hitch pivotally connected with said ball member and movable about the latter relative to said turn control member.

15. In a tractor towed planter, a marker controlling arm comprising a bar, a hitch ball fixed to one end of said bar and including a shank adapted to be connected with the drawbar of a tractor, means for fixing said ball and bar to the tractor drawbar, means at the outer end of said bar for receiving a marker arm controlling part, and a planter hitch frame shiftably connected with said ball.

16. A planter comprising frame means, a pair of marker arms swingably connected therewith, a chain connected to each of said arms, marker raising means connected with the generally central portion of said chain to raise both of said markers, a pair of generally centrally located sheaves over which said chain is trained, and a latch means pivotally mounted in a position generally between said sheaves and engageable alternately with one or the other of the chains at the point where it passes over the associated sheave for locking the associated marker arm in a raised position.

17. A tractor planter adapted to be connected to a tractor, said planter comprising frame means, a power actuated marker raising means, a pair of marker arms swingably connected therewith, a chain connected to each of said arms, a connection extending from said chain to the power actuated means for raising both markers, a pair of generally centrally located sheaves over which said chain is trained, and a latch means pivotally mounted in a position generally between said sheaves and engageable alternately with one or the other of the chains at the point where it passes over the associated sheave for locking the associated marker arm in a raised position.

18. A planter comprising frame means, a pair of marker arms swingably connected therewith, means for raising both of said marker arms including a chain connected to each of said arms, latch means including sections engageable with sections of said chain for locking the associated marker in a raised position, biased overcenter means for holding said latch means in locking position, and an operating member shiftable from one position to another for shifting said overcenter means so as to reverse said latch means and release one marker and hold the other marker in a raised position.

19. In a tractor towed planter, frame means, a pair of marker arms swingably connected therewith, a chain connected at its outer ends with said arms, respectively, means for exerting a pull on said chain comprising a forwardly swingable part mounted on said frame means, and means on said part engaging the generally central portion of said chain, a pair of sheaves over which the sections of the chain extending laterally outwardly from said central portion to said arms extend, and controllable latch mechanism acting alternately against the chain adjacent said sheaves for holding one or the other of said chain sections against outward movement, thereby holding the associated marker arm in a raised position.

20. For use with a tractor towed planter or the like including frame means and a pair of marker arms swingably connected therewith, the improvement comprising means for raising both of said marker arms including a chain connected to each of said arms, a pair of generally centrally located sheaves over which said chain is trained, and a latch means pivotally mounted in a position generally between said sheaves and engageable alternately with one or the other of the chains at the point where it passes over the associated sheave for locking the associated marker arm in a raised position.

21. For use in a tractor towed planter or the like including frame means and a pair of marker arms swingably connected therewith, the improvement comprising means for raising both of said marker arms including a chain connected to each of said arms, a pair of generally centrally located sheaves over which said chain is trained, and a latch lever pivotally mounted in a position generally between said sheaves and having a chain-engaging end engageable alternately with one or the other of the chains at the point where it passes over the associated sheave for locking the associated marker arm in a raised position.

22. For use with a planter of the type adapted to be connected to and propelled in trailing relation by a tractor and having frame means, a pair of marker arms swingably connected therewith, and marker raising means including a pair of elements, one connected with each marker arm, movable adjacent one another, the improvement comprising marker controlling means comprising latch means adapted to be movably mounted on said frame means generally between the adjacent portions of said marker raising elements and engageable alternately with one or the other of said elements for locking the associated marker arm in a raised position, overcenter spring means acting against said movably mounted latch means for yieldably holding the latch means in either of its positions, and means connected with said latch means and adapted to be connected with the tractor so as to be responsive to the turning of the tractor relative to the planter beyond a given position for operating said latch means to shift the latter from one position to another.

23. For use with a planter of the type adapted to be connected to and propelled in trailing relation by a tractor and having frame means, a pair of marker arms swingably connected therewith, a chain connected to each of said arms, marker raising means connected with the generally central portion of said chain to raise both of said markers, and a pair of generally centrally located sheaves over which said chain is trained, the improvement comprising marker controlling means comprising latch means adapted to be pivotally mounted in a position generally between said sheaves and engageable alternately with one or the other of the chains at the point where it passes over the associated sheave for locking the associated marker arm in a raised position, and means adapted to be connected with the tractor so as to be responsive to the turning of the tractor relative to the planter beyond a given position for operating said latch means to shift the latter from one position to another for releasing one or the other of said chains.

24. For use with a planter of the type adapted to be connected to and propelled in trailing relation by a tractor and having frame means, a pair of marker arms swingably connected therewith, and marker raising means including a pair of elements, one connected with each marker arm, movable adjacent one another, the improvement comprising marker controlling means comprising latch means adapted to be movably mounted on said frame means generally between the adjacent portions of said marker raising elements and engageable alternately with one or the other of said elements for locking the associated marker arm in a raised position, overcenter spring means acting against said movably mounted latch means for yieldably holding the latch means in either of its positions, a turn bar adapted to be fixed to the tractor and to extend laterally in one direction, a connection adapted to extend rearwardly from said arm and connectible at its rear end with said movably mounted latch means, whereby turning of the tractor in one direction with respect to the planter serves to shift said latch means in one direction, and a spring adapted to be connected at one end with the planter and connected at its other end with said connection whereby said latch means is shiftable in the other direction when the tractor turns in a direction opposite to said first mentioned direction.

25. For use with a tractor-towed planter including frame means, a pair of marker arms swingably connected therewith, and alternately operable means for locking one or the other of said arms in elevated position, the improvement comprising marker control means including a turn bar adapted to be fixed to the tractor and to extend laterally in one direction, a connection adapted to be connected at its forward end with said turn bar, a lever adapted to be pivotally connected with the planter frame and connected with said alternately operable locking means, and means connecting the rear end of said connection with said lever.

26. The invention set forth in claim 25, further characterized by said connection comprising a flexible tension member connected at its rear end with said lever and operated by turning of the tractor in a direction to exert a pull through said tension member to swing said lever in a direction to operate one of said locking means, and a spring connected at one end to said tension member and adapted to be connected at its other end with the planter frame for swinging said lever in a direction to operate the other locking means when the tractor is turned in the other direction.

27. For use with a tractor-towed planter including frame means, means for connecting the planter to the tractor for lateral swinging relative thereto about the point of hitch, a pair of marker arms swingably connected therewith, and alternately operable means for locking one or the other of said arms in elevated position, the improvement comprising marker control means including a lever adapted to be pivotally connected with the planter frame and connected with said alternately operable locking means, a flexible tension member connected at its rear end with said lever and adapted to be connected at its forward end with the tractor at one side of said hitch point to be operated by turning of the tractor in a direction to exert a pull through said tension member to swing said lever in a direction to operate one of said locking means, and a spring connected at one end to said tension member and adapted to be connected at its other end with the planter frame for swinging said lever in a direction to operate the other locking means when the tractor is turned in the other direction.

CHARLES H. WHITE.
WILLIAM P. OEHLER.

REFERENCES CITED

The following references are of record in the file of this patent:

UNITED STATES PATENTS

| Number | Name | Date |
| --- | --- | --- |
| 442,988 | Moore | Dec. 16, 1890 |
| 958,567 | Ulrich | May 17, 1910 |
| 1,078,846 | Gosnay | Nov. 18, 1913 |
| 1,888,502 | Holstein | Nov. 22, 1932 |
| 1,911,218 | White | May 30, 1933 |
| 2,296,210 | Kriegbaum et al. | Sept. 15, 1942 |
| 2,371,037 | Englund | Mar. 6, 1945 |
| 2,376,464 | White | May 22, 1945 |